(12) United States Patent
Yoon et al.

(10) Patent No.: US 8,836,702 B2
(45) Date of Patent: Sep. 16, 2014

(54) RAY TRACING CORE AND METHOD FOR PROCESSING RAY TRACING

(75) Inventors: Hyung Min Yoon, Seoul (KR); Woo Chan Park, Seoul (KR)

(73) Assignees: Siliconarts Inc. (KR); Industry-Academia Cooperation Group of Sejong University (KR)

( * ) Notice: Subject to any disclaimer, the term of this patent is extended or adjusted under 35 U.S.C. 154(b) by 0 days.

(21) Appl. No.: 13/985,125

(22) PCT Filed: Feb. 18, 2011

(86) PCT No.: PCT/KR2011/001083
§ 371 (c)(1),
(2), (4) Date: Aug. 13, 2013

(87) PCT Pub. No.: WO2012/111864
PCT Pub. Date: Aug. 23, 2012

(65) Prior Publication Data
US 2013/0314420 A1    Nov. 28, 2013

(30) Foreign Application Priority Data
Feb. 14, 2011  (KR) .................. 10-2011-0012860

(51) Int. Cl.
*G06T 15/30* (2011.01)
*G06T 15/06* (2011.01)

(52) U.S. Cl.
CPC ............. *G06T 15/06* (2013.01); *G06T 2200/28* (2013.01)
USPC ............ 345/423; 345/419; 345/426; 345/424

(58) Field of Classification Search
USPC .................................. 345/419, 426, 424, 423
See application file for complete search history.

(56) References Cited

U.S. PATENT DOCUMENTS

| | | | |
|---|---|---|---|
| 6,593,925 B1 * | 7/2003 | Hakura et al. ................ | 345/426 |
| 7,737,974 B2 | 6/2010 | Mejdrich et al. | |
| 8,400,448 B1 * | 3/2013 | Doyle, Jr. ...................... | 345/419 |
| 2008/0079714 A1 * | 4/2008 | Shearer ........................ | 345/419 |
| 2008/0088622 A1 | 4/2008 | Shearer | |
| 2009/0167763 A1 * | 7/2009 | Waechter et al. ............. | 345/426 |
| 2011/0285709 A1 * | 11/2011 | Mejdrich et al. ............. | 345/426 |

OTHER PUBLICATIONS

International Search Report—PCT/KR2011/001083 dated Feb. 20, 2012.

* cited by examiner

*Primary Examiner* — Xiao Wu
*Assistant Examiner* — Steven Elbinger
(74) *Attorney, Agent, or Firm* — Cantor Colburn LLP

(57) ABSTRACT

A ray tracing core comprises a ray tracing unit (RTU), a control unit, and a tree build unit (TBU). The ray tracing unit performs ray tracing based on a spatial partitioning structure. The control unit calculates the degree of complexity of the spatial partitioning structure by monitoring the load state of the ray tracing unit. The tree build unit builds the spatial partitioning structure having the degree of complexity which is calculated. The load state is determined based on a frame rate which is processed in the pertinent unit. The spatial partitioning structure applies a K-dimensional tree. For example, the degree of complexity can be modified according to either the maximum primitive number of a leaf node with respect to a K-dimensional tree structure or a tree depth.

16 Claims, 6 Drawing Sheets

RAY TRACING CORE AND METHOD FOR PROCESSING RAY TRACING

TECHNICAL FIELD

This disclosure relates to three-dimensional graphic processing, and more particularly to a ray tracing core and a method of processing ray tracing.

BACKGROUND ART

A three-dimensional graphic technology is a graphic technology using a three-dimensional expression of geometric data stored in a computer, and has been extensively used for various industries such as a media industry and a game industry. In general, the three-dimensional graphic requires a high performance graphic processor due to a large amount of computation.

In recent years, with advancement of the processor technology, researches and studies have been performed toward a ray tracing technology capable of creating a realistic three-dimensional graphic.

The ray tracing technology is a rendering scheme according to global illumination, and may generate a realistic 3D image because reflection, refraction, shadow effect are naturally provided by considering an influence of light reflected and refracted from another object.

TECHNICAL SOLUTION

According to an embodiment of the invention, there is provided a ray tracing core including a ray tracing unit (RTU), a control unit, and a tree build unit (TBU). The ray tracing unit performs ray tracing based on a spatial partitioning structure. The control unit calculates a degree of complexity of the spatial partitioning structure by monitoring the load state of the ray tracing unit. The tree build unit builds the spatial partitioning structure having the degree of complexity which is calculated. In one embodiment, the load state is determined based on a frame rate which is processed in the pertinent unit. In another embodiment, the spatial partitioning structure applies a K-dimensional tree. For example, the degree of complexity can be modified according to either the maximum primitive number of a leaf node with respect to a K-dimensional tree structure or a tree depth. In an embodiment, the ray tracing core may further include: a primitive cache which provides a primitive scene to the tree build unit; and an acceleration structure result buffer which receives a processing result with respect to the primitive scene from the tree build unit. In another embodiment, the ray tracing core may further include: an acceleration structure cache which provides tree build information with respect to a primitive scene processed by the tree build unit to the ray tracing unit; a texture cache which provides a texture to the ray tracing unit; and a color result buffer which receives the tree build information and a processing result with respect to the texture from the ray tracing unit.

According to an embodiment of the invention, there is provided a method of processing ray tracing by a ray tracing processing apparatus, the method including: (a) performing ray tracing based on a spatial partitioning structure; (b) calculating a degree of complexity of the spatial partitioning structure by monitoring a load state when the ray tracing is performed; and (c) building the spatial partitioning structure having the calculated degree of complexity. The step (b) may include: (b1) monitoring a load state of a ray tracing unit and a load state of a tree build unit; (b2) comparing a load in the ray tracing unit with a load of the tree build unit to control the degree of complexity of the spatial partitioning structure; and (b3) providing the controlled degree of complexity to the tree build unit. The step (b1) may include: (b1-1) confirming a frame processing speed of the ray tracing unit; (b1-2) confirming a frame processing speed of the tree build unit; (b1-3) calculating a frame rate per unit time processed by the ray tracing unit and a frame rate per unit time processed by the tree build unit; and (b1-4) determining a load state of the ray tracing unit and a load state of the tree build unit based on the calculated frame rate. The spatial partitioning structure may apply a bounding volume Hierarchy (BVH) or K-dimensional (KD) tree, and the degree of complexity is modified according to either the maximum primitive number of a leaf node with respect to a BVD, or KD tree structure and/or a tree depth. In one embodiment, when the load of the ray tracing unit is larger than a load of the tree build unit, the control unit reduces the degree of complexity of the spatial partitioning structure by increasing the maximum primitive number and reducing the tree depth. In another embodiment, when the load of the ray tracing unit is less than the load of the tree build unit, step (b2) may increase the degree of complexity of the spatial partitioning structure by increasing the maximum primitive number and reducing the tree depth.

According to an embodiment of the invention, there is provided a ray tracing processing apparatus including: a central processing unit which executes a three-dimensional application; a system memory which stores graphic data information necessary for the three-dimensional application; and a dynamic ray tracing accelerator (DRTX) which builds the spatial partitioning structure based on the graphic data information, performs ray tracing based on the spatial partitioning structure, and rebuilds the space partitioning structure with respect to the graphic data information by monitoring ray tracing speed. The ray tracing processing apparatus may further include an external memory operatively associated with the DRTX, and storing an acceleration structure of the spatial partitioning structure built according to the graphic data information necessary for the three-dimensional application and providing the acceleration structure of the spatial partitioning structure to the DRTX. The system memory may include: a primitive static scene (PPS) area which stores static scene information necessary for the three-dimensional application; a primitive dynamic scene (PDS) area which stores dynamic scene information necessary for the three-dimensional application; and a texture map area which stores an MIP-MAP for mapping a texture. In another embodiment, the DRTX may include: a ray tracing unit (RTU) which performs ray tracing with respect to a static scene and/or a dynamic scene based on the spatial partitioning structure; a control unit which calculates a degree of complexity of the spatial partitioning structure by monitoring a load state of the ray tracing unit; and a tree build unit which builds the spatial partitioning structure having the degree of complexity which is calculated with respect to the dynamic scene. The ray tracing processing apparatus may further include an external memory which stores an acceleration structure of the spatial partitioning structure built according to a corresponding static scene and/or dynamic scene built in the tree build unit, and provides the acceleration structure of the spatial partitioning structure to the ray tracing unit.

BEST MODE

Mode for Invention

Figure 1:
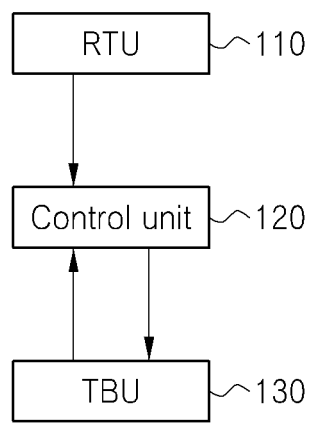
FIG. 1 is a block diagram illustrating a ray tracing core according to an embodiment of this disclosure.

The embodiments and the configurations depicted in the drawings are illustrative purposes only and do not represent all technical scopes of the invention, so it should be understood that various equivalents and modifications may exist at the time of filing this application. Although a preferred embodiment of the disclosure has been described for illustrative purposes, those skilled in the art will appreciate that various modifications, additions and substitutions are possible, without departing from the scope and spirit of the invention as disclosed in the accompanying claims.

Terms and words used in the specification and the claims shall be interpreted as to be relevant to the technical scope of the invention based on the fact that the inventor may property define the concept of the terms to explain the invention in best ways.

The terms "first" and "second" can be used to refer to various components, but the components may not be limited to the above terms. The terms will be used to discriminate one component from the other component. For instance, the first component may be referred to the second component and vice versa without departing from the right of the disclosure.

The term "and/or" will be used to refer to the combination of plural items or any one item of the plural items. For example, "a first item, a second item, and/or a third item" signify all combinations of at least two of the first item, the second item, and/or the third item as well as the first item, the second item, and/or the third item.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms used in the specification are for the purpose of explaining specific embodiments and have no intention to limit the disclosure. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Reference numerals, for example, a, b, c, . . . are used for the purpose of illustration. The reference numerals do not describe an order of respective steps. The respective steps may be performed differently from an expressed order if the context does not describe a specific order. That is, the respective steps may be performed in the same order as the expressed order, may be simultaneously performed and may be performed in an opposite order.

Unless defined otherwise, the terms including technical and scientific terms used in this specification may have the meaning that can be commonly apprehended by those skilled in the art. The terms, such as the terms defined in the commonly-used dictionary, must be interpreted based on the context of the related technology and must not be interpreted ideally or excessively.

FIG. 1 is a block diagram illustrating a ray tracing core according to an embodiment of this disclosure.

Referring to FIG. 1, the ray tracing core includes a ray tracing unit (RTU) 110, a control unit 120, and a tree build unit (TBU) 130.

The RTU 110 performs ray tracing based on a spatial partitioning structure. The method of performing the ray tracing will be described in detail later.

The control unit 120 calculates the degree of complexity of the spatial partitioning structure by monitoring a load state of the RTU 110. For example, the load state may be determined based on a frame rate which is processed in the RTU 110 and/or the TBU 130.

The TBU 130 builds the spatial partitioning structure having the degree of complexity which is calculated. For example, the spatial partitioning structure may apply a bounding volume Hierarchy (BVH) or K-dimensional (KD) tree. The degree of complexity may be modified according to either the maximum primitive number of a leaf node with respect to the BVD, or KD-tree structure and/or a tree depth. The BVD or KD-tree will be described in detail later. For example, if the maximum primitive number of leaf nodes or the total tree depth increases, the quality in an acceleration structure (AS) is degraded, but processing speed of the TBU 130 may be improved. As another example, if the maximum primitive number of leaf nodes reduces or the total tree depth increases, the quality in an acceleration structure (AS) is improved, which may result in an increase in the performance of the ray tracing, but the processing speed of the TBU 130 may be reduced. Accordingly, if the performance of the TBU 130 is degraded, the TBU 130 may control and improve the processing speed of the TBU 130. If the performance of the TBU 130 is sufficient, the TBU 130 may control and improve the quality in the AS.

Figure 5:
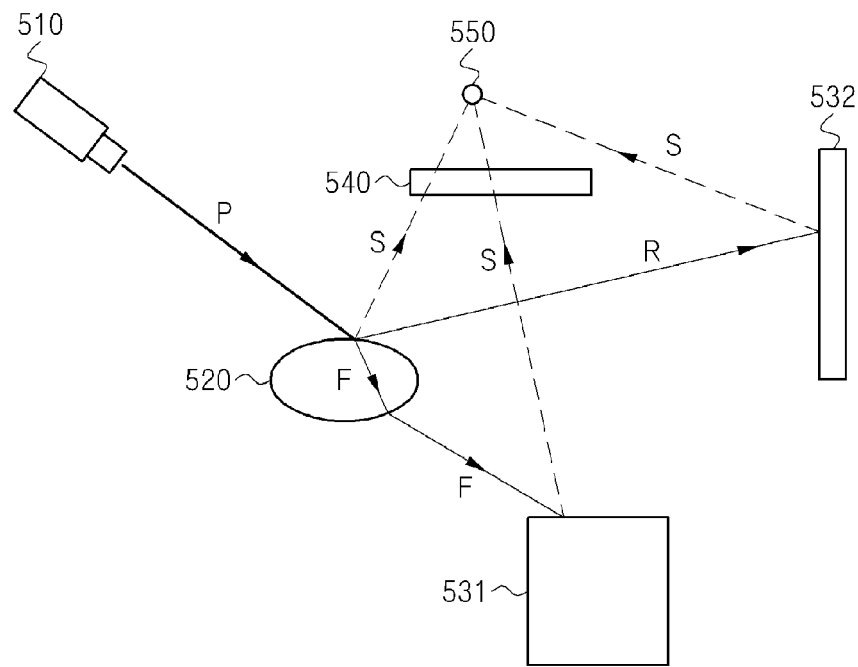
FIG. 5 is a diagram illustrating the method of processing ray tracing.

FIG. 5 is a diagram illustrating the method of processing ray tracing.

Referring to FIG. 5, the ray tracing core generates a primary ray P from a position of a camera 510 per pixel and calculates an object 520 meeting with the primary ray P. When an object meeting a corresponding ray P is an object 520 having a refractive property or objects 531 and 532 having a reflective property, a refraction ray F for a refractive effect and/or a reflection ray R for a refractive effect may be generated at a location with which the corresponding ray P and the object meet, and a shadow ray S may be generated in a direction of a light 550. In an embodiment, if the shadow ray S meets with another object 540, a shadow may be generated at a point at which the corresponding shadow ray S is generated.

Figure 6:
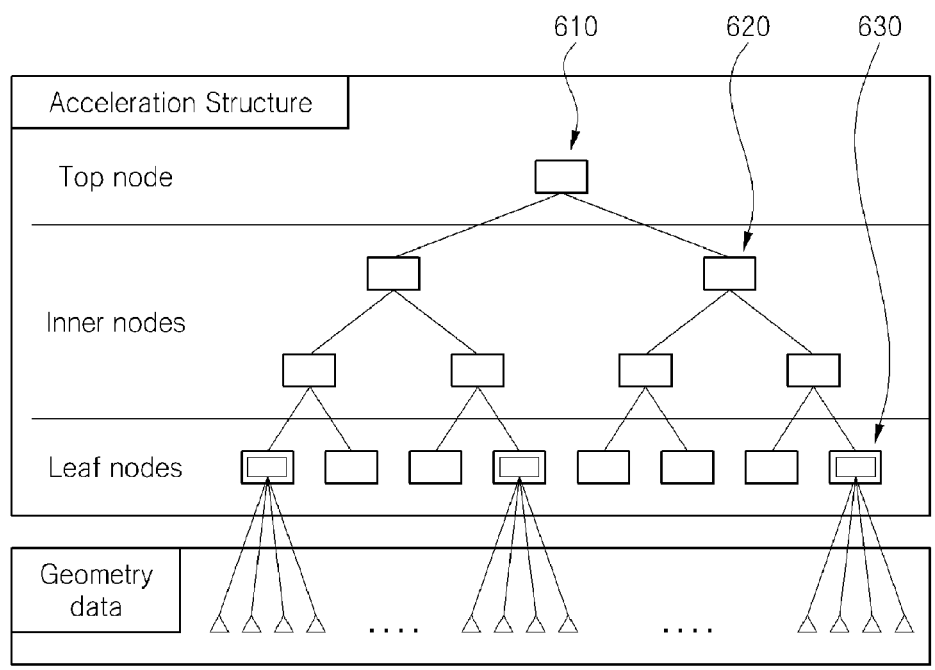
FIG. 6 is a diagram illustrating an acceleration structure and geometric data used for the disclosed invention.

FIG. 6 is a diagram illustrating an acceleration structure and geometric data used for this disclosure.

In FIG. 6, it is assumed that an acceleration structure AS uses a KD-tree. The KD-tree is a type of spatial partitioning structure and may be used for ray-triangle intersection test. For example, the KD-tree includes a box node 610, an inner node 620, and a leaf node 630. For example, the leaf node 630 may include a triangle list pointing at least one triangle information included in geometric data. For instance, the triangle information may include color coordinates, normal vectors, and/or texture coordinates. For example, when the triangle information included in the geometric data is arranged, the triangle list included in the leaf node may correspond to an arrangement index.

Figure 3:
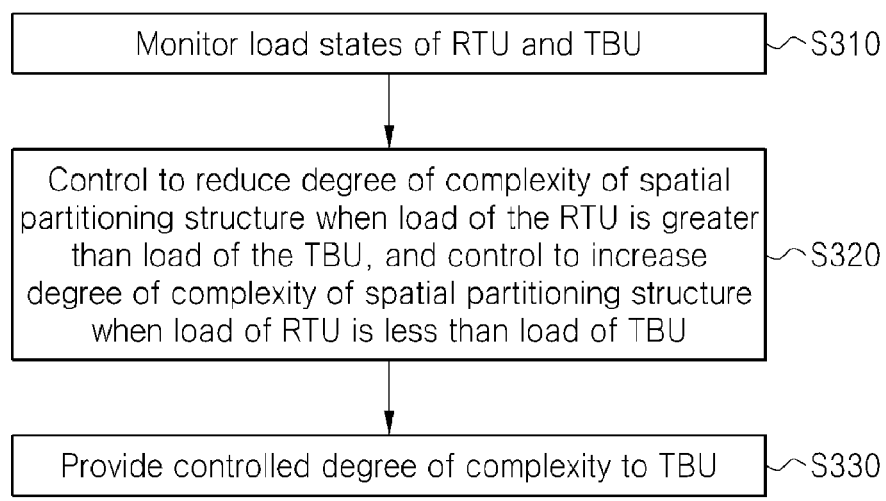
FIG. 3 is a flowchart illustrating a method of processing ray tracing performed in FIG. 1.

FIG. 3 is a flowchart illustrating a method of processing ray tracing performed in FIG. 1.

Referring to FIG. 3, a control unit 120 may monitor load states of an RTU 110 and a TBU 130, respectively (step S310). For example, the RTU 110 may perform ray tracing based on a spatial partitioning structure, and the TBU 130 may build the spatial partitioning structure.

When the load of the RTU 110 is greater than the load of the TBU 130, the control unit 120 may control and reduce the degree of complexity of the spatial partitioning structure. In contrast, when the load of the RTU 110 is less than the load of the TBU 130, the control unit 120 may control and increase the degree of complexity of the spatial partitioning structure (step S320).

The control unit 120 may provide the controlled degree of complexity to the TBU 130 (step S330). For example, the TBU 130 may reconfigure the spatial partitioning structure corresponding to the controlled degree of complexity provided from the control unit 120.

Figure 2:
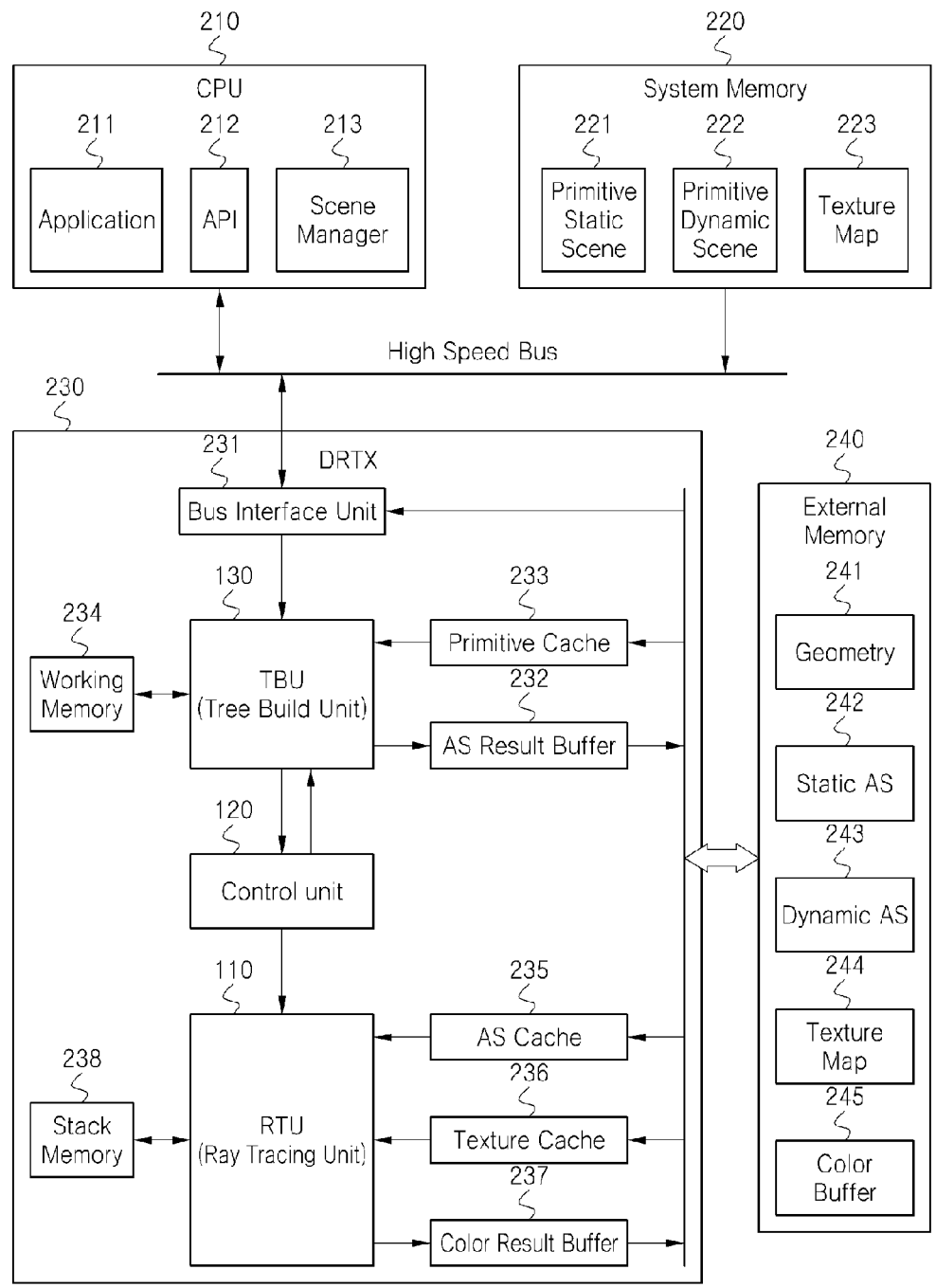
FIG. 2 is a block diagram illustrating a ray tracing apparatus including the ray tracing core shown in FIG. 1.

FIG. 2 is block diagram illustrating a ray tracing apparatus including the ray tracing core shown in FIG. 1.

Referring to FIG. 2, the ray tracing apparatus 200 may include a central processing unit (CPU) 210, a system memory 220, a dynamic ray tracing accelerator (DRTX) 230, and an external memory 240.

The CPU 210 may process a three-dimensional application, and may include an application 211 such as a three-dimensional game engine, an application programming interface (API) 212, and/or a scene manager.

The system memory 220 may store graphic data information necessary for the three-dimensional application, and may include a primitive static scene (PPS) area 221 storing a PPS, a primitive dynamic scene (PDS) area 222 storing a PDS, and/or a texture map area 223 storing an MIP-MAP for mapping a texture.

The DRTX 230 includes the ray tracing core 100 shown in FIG. 1, and may further include a bus interface unit 231, an AS result buffer 232, a primitive cache 233, a working memory 234, an AS cache 235, a texture cache 236, a color result buffer 237, and/or a stack memory 238. For example, the DRTX 230 may build the spatial partitioning structure based on graphic data information, perform ray tracing based on the spatial partitioning structure, provide a result of the performed ray tracing to the CPU 210, and rebuild the space partitioning structure with respect to the graphic data information by monitoring the ray tracing speed.

The external memory 240 may temporarily store information processed by the DRTX 230, and may include a geometric information storage area 241, a static scene AS storage area 242, a dynamic scene AS storage area 243, a texture map storage area 244, and/or a color information storage area 245.

Figure 4:
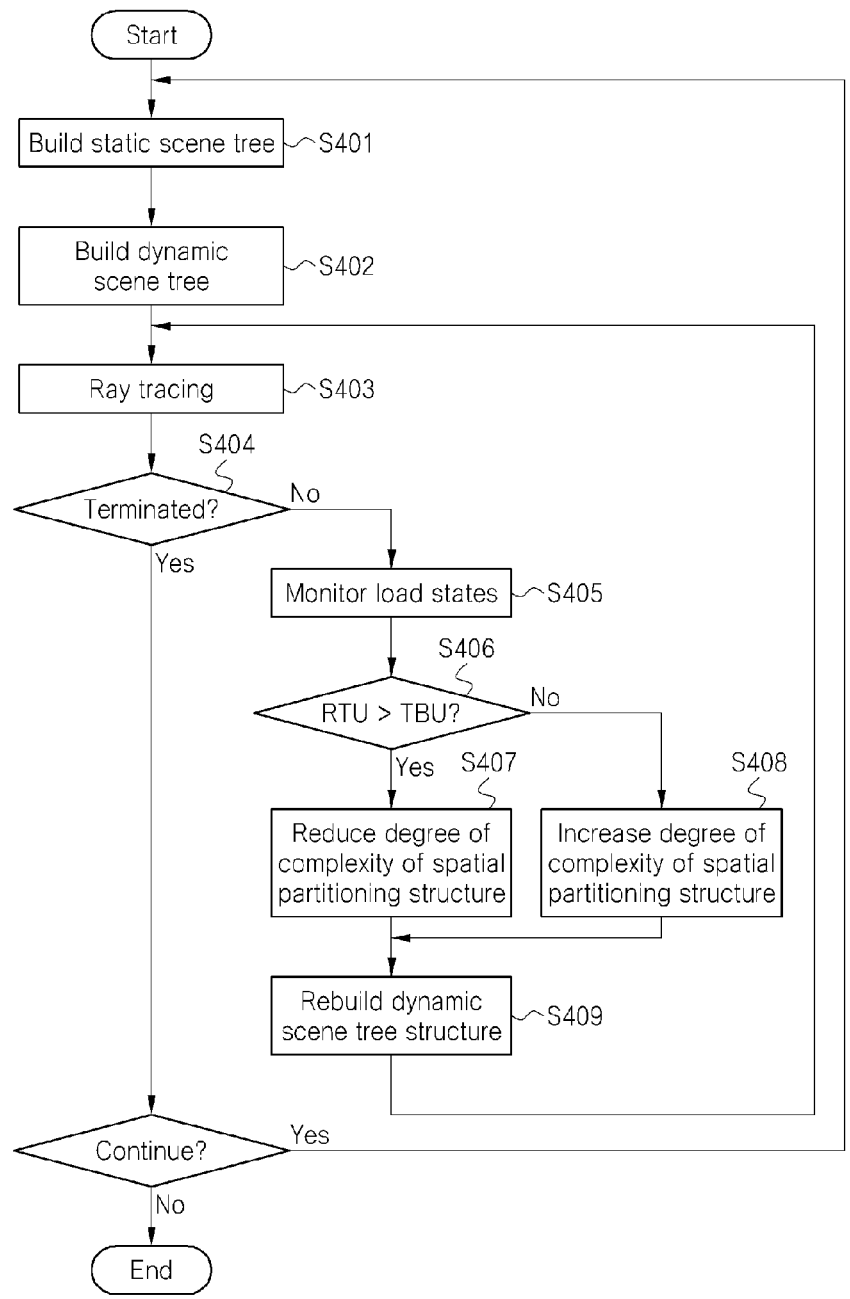
FIG. 4 is a flowchart illustrating an example of a method of processing ray tracing shown in FIG. 3.

FIG. 4 is a flowchart illustrating an example of a method of processing ray tracing shown in FIG. 3 in detail.

Referring to a configuration of FIG. 2 in FIG. 4, if an application 211 of the CPU 210 is driven, a scene manger 213 may perform a preprocessing procedure to store a static scene, a dynamic scene, and a texture map in each area of the system memory 220. In an embodiment, the CPU 210, the system memory 220, and the DRTX 230 may transmit data through a high speed bus.

The DRTX 230 transmits a static scene stored in the system memory 220 to the TBU 130 through the bus interface unit 231, and the TBU 130 builds a tree with respect to the static scene (step S401). The built static scene tree structure may be stored in a static scene AS structure storage area 242 through the AS result buffer 232.

The DRTX 230 transmits a dynamic scene stored in the system memory 220 to the TBU 130 through the bus interface unit 231, and the TBU 130 builds a tree with respect to the dynamic scene (step S402). The built dynamic scene tree structure may be stored in a dynamic scene AS structure storage area 243 through the AS result buffer 232.

The DRTX 230 may store geometric information of each structure in a geometric information storage area 241 while storing the static scene tree structure and the dynamic scene tree structure. The DRTX 230 may interwork the work memory 234 in a procedure of generating a tree structure of each scene.

The RTU 110 may call the static scene tree structure and the dynamic scene tree structure stored in the external memory 240 through the AS cache 235 to perform the ray tracing (step S403). For example, the RTU 110 may perform the ray tracing using the stack memory 238. In an embodiment, the texture map stored in the texture map area 223 of the system memory 220 is stored in a texture map storage area 244 of the external memory 240, and may be transmitted to the RTU 110 through the texture cache 236.

When the ray tracing is continuously performed without terminating the three-dimensional application (step S404), the control unit 120 may monitor load states of the RTU 110 and the TBU 130 (step S405). In an embodiment, the control unit 120 may confirm frame processing speed of the RTU 110 and frame processing speed of the TBU 130, calculate a frame rate per unit time processed by the RTU 111 and a frame rate per unit time processed by the TBU 130, and determine the load states based on the calculated frame rates.

When performance of the RTU 110 is higher than performance of the TBU 130 (step S406), the control unit 120 may determine that a large load is applied to the TBU 130. In order to reduce the load of the TBU 130, the control unit 120 may control the TBU 130 to reduce the degree of complexity of the spatial partitioning structure (S407). In an embodiment, the TBU 130 controls to reduce the degree of complexity of the spatial partitioning structure by increasing the maximum primitive number of leaf nodes or reducing the tree depth.

When performance of the RTU 110 is lower than performance of the TBU 130 (step S406), the control unit 120 may determine that a suitable load is applied to the TBU 130 and may control the TBU 130 to increase the degree of complexity of the spatial partitioning structure in order to improve the quality of the AS (step S408). The TBU 130 controls and increases the degree of complexity of the spatial partitioning structure by reducing the maximum primitive number of leaf nodes or increasing the tree depth.

The TBU 130 may rebuild a dynamic scene tree structure under control of the control unit 120 (step S409).

Steps S405 to S409 by the RTU 110, the control unit 120, and the TBU 130 may be repeatedly performed until request of the three-dimensional application or termination of the three-dimensional application is achieved.

The disclosed technology has follow effects. However, since a specific embodiment may provide all the following effects or a few of them, the scope of the disclosure is not limited thereto.

The ray tracing core and the method of processing ray tracing according to an embodiment can improve ray tracing performance. That is, a resource required by each unit may be prevented from becoming insufficient or unnecessarily wasted, by monitoring or controlling the each unit.

The ray tracing core and the method of processing ray tracing according to an embodiment can improve performance of an apparatus for processing a three-dimensional image. That is, image processing of a rendering scheme according to global illumination may be performed in real time by improving processing speed of ray tracing.

The ray tracing core and the method of processing ray tracing according to an embodiment is applicable to a three-dimensional image processor which has been developed and a three-dimensional image processor which is currently used. This is because the disclosed technology may be performed by replacing only a ray tracing core according to a technology disclosed in an existing device and by updating a program.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A ray tracing core comprising:
a tree build unit building a spatial partitioning structure which is used for ray-triangle intersection test and built according to a static scene and/or a dynamic scene;
a ray tracing unit (RTU) performing ray tracing based on the spatial partitioning structure; and
a control unit monitoring a load state of the ray tracing unit and a load state of the tree build unit, comparing a load of the ray tracing unit with a load of the tree build unit to control a degree of complexity of the spatial partitioning structure, and providing the controlled degree of complexity to the tree build unit,
wherein the tree build unit builds the spatial partitioning structure having the controlled degree of complexity.

2. The ray tracing core of claim 1, wherein the load state is determined based on a frame rate which is processed in a pertinent unit.

3. The ray tracing core of claim 1, wherein the spatial partitioning structure applies a bounding volume Hierarchy (BVH) or K-dimensional (KD) tree.

4. The ray tracing core of claim 3, wherein the degree of complexity is modified according to either a maximum primitive number of a leaf node with respect to a BVD, or KD tree structure and/or a tree depth.

5. The ray tracing core of claim 1, further comprising:
a primitive cache providing a primitive scene to the tree build unit; and
an acceleration structure result buffer receiving a processing result with respect to the primitive scene from the tree build unit.

6. The ray tracing core of claim 1, further comprising:
an acceleration structure cache providing tree build information with respect to a primitive scene processed by the tree build unit to the ray tracing unit;
a texture cache providing a texture to the ray tracing unit; and
a color result buffer receiving the tree build information and a processing result with respect to the texture from the ray tracing unit.

7. A method of processing ray tracing by a ray tracing processing apparatus, the method comprising:
building a spatial partitioning structure which is used for ray-triangle intersection test and built according to a static scene and/or dynamic scene;
performing ray tracing based on the spatial partitioning structure;
monitoring a load state of a ray tracing unit and a load state of a tree build unit;
comparing a load of the ray tracing unit with a load of the tree build unit to control a degree of complexity of the spatial partitioning structure; and
building the spatial partitioning structure having the controlled degree of complexity.

8. The method of claim 7, wherein the monitoring comprises:
confirming a frame processing speed of the ray tracing unit;
confirming a frame processing speed of the tree build unit;
calculating a frame rate per unit time processed by the ray tracing unit and a frame rate per unit time processed by the tree build unit; and
determining the load state of the ray tracing unit and the load state of the tree build unit based on the calculated frame rate.

9. The method of claim 7, wherein the spatial partitioning structure applies a bounding volume Hierarchy (BVH) or K-dimensional (KD) tree, and the degree of complexity is modified according to either a maximum primitive number of a leaf node with respect to a BVD, or KD tree structure and/or a tree depth.

10. The method of claim 9, wherein, when the load of the ray tracing unit is larger than the load of the tree build unit, a control unit of the apparatus reduces the degree of complexity of the spatial partitioning structure by increasing the maximum primitive number and reducing the tree depth.

11. The method of claim 9, wherein, when the load of the ray tracing unit is less than the load of the tree build unit, the comparing comprises increasing the degree of complexity of the spatial partitioning structure by decreasing the maximum primitive number and increasing the tree depth.

12. A ray tracing processing apparatus comprising:
a central processing unit executing a three-dimensional application;
a system memory storing graphic data information necessary for the three-dimensional application; and
a dynamic ray tracing accelerator (DRTX) building a spatial partitioning structure which is used for a ray-triangle intersection test and built according to a static scene and/or a dynamic scene, performing ray tracing based on the spatial partitioning structure, monitoring a load state of ray tracing and a load state of building a spatial partitioning structure, comparing a load state of ray tracing with a load state of building the spatial partitioning structure to control a degree of complexity of the spatial partitioning structure, and rebuilding the spatial partitioning structure having the controlled degree of complexity.

13. The ray tracing processing apparatus of claim 12, further comprising an external memory operatively associated with the DRTX, and storing an acceleration structure of the spatial partitioning structure built according to a graphic data information necessary for the three-dimensional application and providing the acceleration structure of the spatial partitioning structure to the DRTX.

14. The ray tracing processing apparatus of claim 12, wherein the system memory comprises:

a primitive static scene (PSS) area storing static scene information necessary for the three-dimensional application;

a primitive dynamic scene (PDS) area storing dynamic scene information necessary for the three-dimensional application; and a texture map area storing a MIP-MAP for mapping a texture.

15. The ray tracing processing apparatus of claim 12, wherein the DRTX comprises:

a ray tracing unit (RTU) performing ray tracing with respect to a static scene and/or a dynamic scene based on the spatial partitioning structure;

a control unit calculating a degree of complexity of the spatial partitioning structure by monitoring a load state of the ray tracing unit; and a tree build unit building the spatial partitioning structure having the degree of complexity which is calculated with respect to the dynamic scene.

16. The ray tracing processing apparatus of claim 15, further comprising an external memory storing an acceleration structure of the spatial partitioning structure built according to a corresponding static scene and/or dynamic scene built in the tree build unit, and providing the acceleration structure of the spatial partitioning structure to the ray tracing unit.

* * * * *